United States Patent [19]
Hentschel

[11] Patent Number: 5,251,832
[45] Date of Patent: Oct. 12, 1993

[54] TRANSPORTABLE FACILITY FOR RECYCLING WASTE PLASTICS

[75] Inventor: Martin Hentschel, Mainbernheim, Fed. Rep. of Germany

[73] Assignee: REAL GmbH, Mainbernheim, Fed. Rep. of Germany

[21] Appl. No.: 842,911

[22] Filed: Feb. 27, 1992

[30] Foreign Application Priority Data

Mar. 5, 1991 [DE] Fed. Rep. of Germany ....... 4106942

[51] Int. Cl.$^5$ .............................................. B02C 21/02
[52] U.S. Cl. ............................... 241/101.7; 241/101.6; 241/285.1; 241/285.3; 241/DIG. 38
[58] Field of Search .............. 241/101.6, 101.7, 285.1, 241/DIG. 38, 285.3, 101.4

[56] References Cited

U.S. PATENT DOCUMENTS

| | | | |
|---|---|---|---|
| 2,836,211 | 5/1958 | Wetmore | 241/101.6 X |
| 3,409,235 | 11/1968 | Quinn | 241/101.7 X |
| 3,563,477 | 2/1971 | Schroeder et al. | 241/101.7 |
| 3,618,866 | 11/1971 | Robinson | 241/DIG. 38 X |
| 3,995,819 | 12/1976 | Kunogi et al. | 241/101.4 X |
| 4,000,860 | 1/1977 | Gotham | 241/285.3 X |
| 4,205,799 | 6/1980 | Brewer | 241/285.3 X |
| 4,344,579 | 8/1982 | Morita et al. | 241/101.6 X |
| 4,655,402 | 4/1987 | Desourdy | 241/101.7 X |
| 4,795,103 | 1/1989 | Lech | 241/101.7 X |

FOREIGN PATENT DOCUMENTS 4005331  8/1991  Fed. Rep. of Germany ... 241/101.7

Primary Examiner—Frank T. Yost
Assistant Examiner—Raymond D. Woods
Attorney, Agent, or Firm—Sprung Horn Kramer & Woods

[57] ABSTRACT

A transportable facility for recycling waste plastics comprises at least one chipper, one storage hopper, and one extruder connected by constant-operation conveyors and integrated into components that are ready to either operate or move to another site. The components can be combined into an enclosed and modular production plant.

10 Claims, 3 Drawing Sheets

TRANSPORTABLE FACILITY FOR RECYCLING WASTE PLASTICS

BACKGROUND OF THE INVENTION

The invention concerns a transportable facility for recycling waste plastics comprising at least one chipper, one storage hopper, and one extruder connected by constant-operation conveyors integrated into components that are ready to either operate or move to another site.

A plastics-recycling facility of the aforesaid type is known from the U.S. Pat. No. 4,344,579. The separate components are on castors and can be moved around like any small piece of equipment. They are connected by open lines, which makes them difficult to start up once they have been moved to another site and requires skill in setting them up. The patent makes no mention of mobility in the sense of constantly changing the site of utilization.

Stationary plastics-recycling facilities with their different systems integrated into a single unit are well known. They primarily produce extruded section and sheet plastic. Since they are usually established where they can be reached from several sources of raw material, the mean travelling distance is fairly long. The prices attainable for products of recycled waste plastic are comparatively low, and consequently stationary facilities take a long time to amortize.

SUMMARY OF THE INVENTION

The principal object of the present invention is to improve a recycling facility of the aforesaid type so as to shorten the amortization time of the facility.

This object, as well as other objects which will become apparent from the discussion that follows, are attained, in accordance with the present invention, by constructing the facility with components which are ready to either operate or move to another site. The facility can accordingly move to any waste-plastics collection site, even a site that is operated independently of any other, when necessary. This facility can accordingly be exploited more efficiently than previously known facilities of this type. Not only the mean distance from where the waste is discarded to where it is to be processed but also the distance from where it is processed to where it is to be used can be substantially shortened. The facility's output by volume will accordingly be higher. Large-scale facilities leased for use at both industrial and municipal waste-plastics collection sites also allow the manufacture of special-purpose and high-quality products while substantially reducing the overall volume of waste.

Components arriving at a new site can be instantly combined into an intact and modular processing unit, which can accordingly be rapidly, correctly, and simply assembled and disassembled by unskilled workers. No open lines between the separate components are necessary. Only the absolute minimum of space is occupied.

The processing system can be mounted on an optionally motorized chassis.

The result is not only optimal mobility but also operation with minimal labor costs.

Investment costs can be reduced by transporting the facility on flatbed trailers. The facility components can accordingly be shipped by express when leased.

It has been demonstrated to be practical from the aspect of labor technology to assemble the components essentially without foundations. The components in one advantageous embodiment of the invention can accordingly be mounted on pallets, those for example with the same area as a conventional railroad or ocean-shipping container. Loading and unloading the components with the container-handling machinery associated with up-to-date trucks will present no problems especially when the components are of the same size or have matching loading structures.

Plastic waste is especially likely to attract such foreign matter as water and dirt. For the manufacture of high-quality products it may accordingly be necessary to prepare the material before actually processing it. Such preliminary treatment might comprise washing and drying, for example. At least the systems employed for these purposes should be air-conditioned and sealed off from the environment. Other equipment, such as chippers, storage hoppers, mixers, and extruders, however, are also sensitive to, and should accordingly be insulated from the environment and if necessary air-conditioned or at least roofed over.

Access to the processing systems will be facilitated if at least one side of the components is demarcated by a continuous fold-down wall. Such a wall also facilitates temporary storage of starting materials or finished products protected from contamination.

It has been demonstrated to be practical for the components to be designed with their length, width, and height conforming to a uniform grid that allows only half, quarter, and full units. Such a procedure allows the components to be directly interconnected not only just while they are in operation but also often while they are being transported. Assembly, shipping, and storage problems are often simplified in this way. The overall plastics-recycling facility can accordingly be industrially operated as an integrated unit, which makes it particularly economical.

The preferred embodiment of the invention will now be described with reference to the accompanying drawing.

DESCRIPTION OF THE PREFERRED EMBODIMENTS

Figure 1:
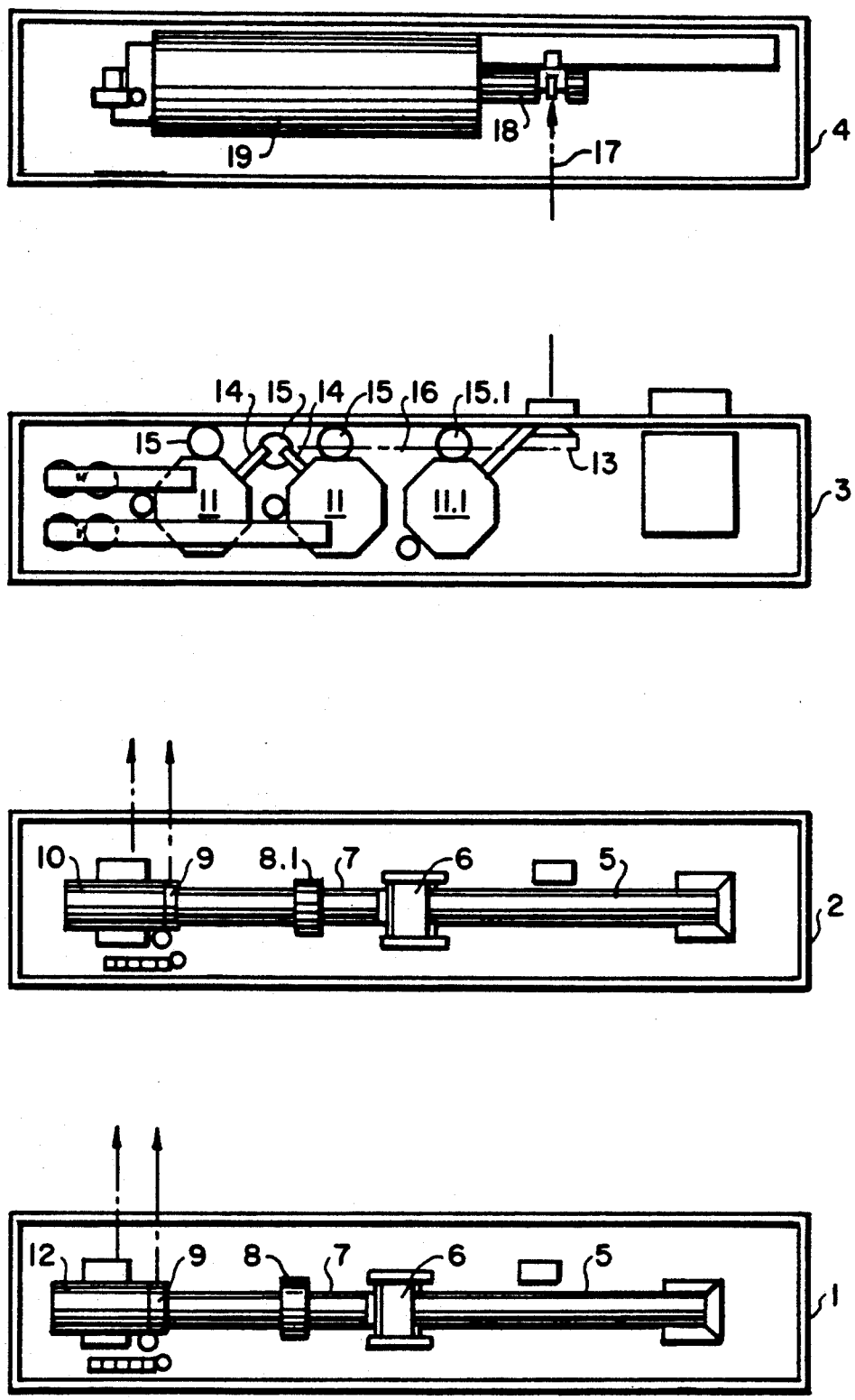
FIG. 1 is an overhead view of four adjacent railroad containers which together form the facility according to the present invention.

As illustrated in FIG. 1, container 1 accommodates all the equipment needed for processing hard plastics; container 2, everything needed for processing soft plastics; container 3 accessories for stockpiling and mixing granulated plastics, dyes, and fillers, and container 4 a complete recycling system. The recycling system comprises an extruder with a number of dies that revolve into position. When the containers are to be operated, they can be directly interconnected or stacked with automatic connectors.

The railroad containers in the illustrated embodiment are all the same size. When necessary some can be a half or quarter of that size for an individual function with correspondingly reduced outputs and can be directly attached to components of the illustrated dimensions to create a ready-to-operate plastics-recycling facility as long as they conform to the same grid.

Chipped plastics can be transferred from one component to another by constant-operation pneumatic conveyors accommodated in the components. Such conveyors are powered by blowers of the conventional type. Routes can be established with an integrated combination of supply and removal lines attached by rapid-action connectors.

The operation of the facility when recycling will now be described.

The roughly sorted starting material, which may contain both soft and hard plastics, is transferred to a conveyor belt 5 and pelletized in a chipper 6. Another conveyor belt 7 forwards the chips under a magnet 8 or through a magnetized-roller separator 8.1 to a distributor 9. The next stage of the operation depends on the type of plastic.

Distributor 9 forwards sheet directly to a compactor 10, that compacts it into a bulk material. The bulk can be packaged in sacks and stored or, for direct processing, blown into a storage hopper 11.

Distributor 9 forwards hard plastics on the other hand directly to a grinder 12. The resulting powder is blown into another storage hopper 11.1. The powder can be sacked if desired at a point 13.

Take-out screw conveyor 14 loads a cylindrical mixer 15. The mixer blends the material and dries it if necessary. Another screw conveyor 16 and a screw conveyor 17 supply a processor 18 with homogenized material from the mixer 15. Another mixer 15.1 can in the meantime be preparing the next blend if necessary.

The processor 18 in the present embodiment is an extruder with several dies 19 that can be revolved into place. The extruder can be water-cooled.

The resulting plastic products are stored in a cooling wagon and will attain final stability in approximately 6 to 8 hours, depending upon the thickness of the product walls.

FIGS. 2 through 7 illustrate details of the facility for recycling waste plastics in accordance with the invention. In its simplest form, it comprises two components, one containing equipment for preliminarily processing the plastics and the other containing equipment for final processing. Other components can contain storage space, power supplies, and/or employee lounges. An essential characteristic is that all such components can be directly interconnected although they can also be set up separately when necessary and interconnected by lines.

Figure 2:
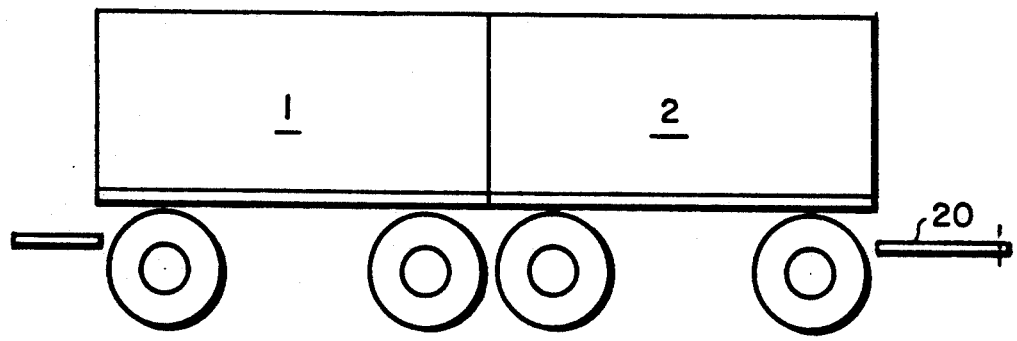
FIG. 2 is a side view showing two components of a plastics recycling facility arranged on wheels.

FIG. 2 illustrates a recycling facility with two components 1 and 2 on truck trailers 20. When the components are to be combined into a processing unit, trailers 20 are backed together, establishing a direct interconnection between components 1 and 2.

Figure 3:
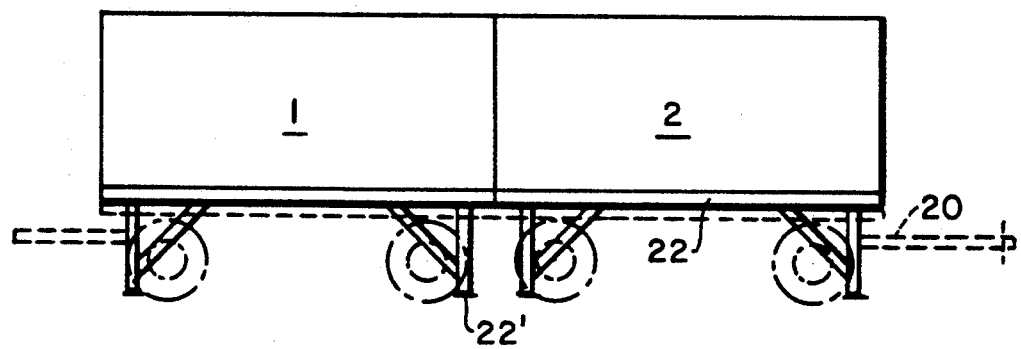
FIG. 3 is a side view showing two components of a plastics recycling facility on flatbed trailers.

FIG. 3 illustrates an embodiment with two components 1 and 2 on truck flatbeds 22. Flatbeds 22 are provided with legs 22' that fold down to the ground, leaving the flatbeds high enough for the trailers 20 to be driven out from under them. The trailers can accordingly be employed for other purposes while the facility is in operation. Components 1 and 2 are again backed directly together. When necessary they can be supplemented by additional, unillustrated, components at either their ends or their sides.

Figure 4:
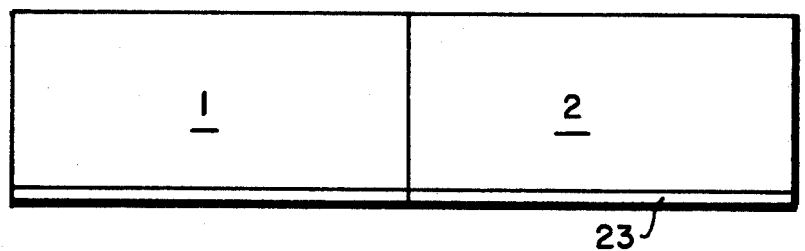
FIG. 4 is a side view showing two components of a plastics recycling facility arranged on pallets.

FIG. 4 illustrates an embodiment with two components 1 and 2 mounted on pallets 23 and positioned directly together to form a ready-to-operate recycling facility. The components in this embodiment as well can be supplemented by additional, unillustrated, components at either their ends or their sides.

Figure 5:
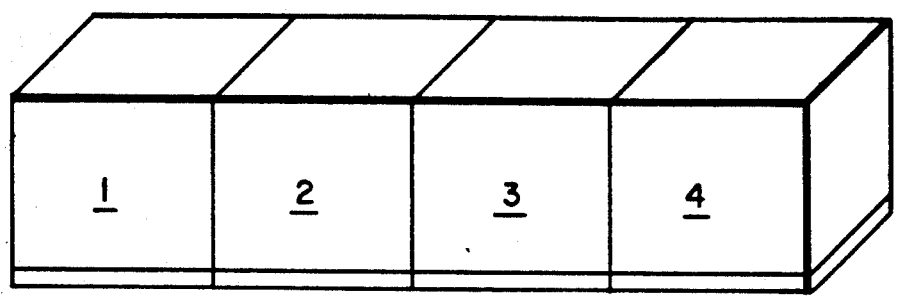
FIG. 5 is a perspective view of four components of a plastics recycling facility wherein all the components are equal in length, width and height.

FIG. 5 illustrates four interconnected components 1, 2, 3, and 4 equal in length, width, and height. The equal bases particularly facilitate combining such components into a recycling facility. In this case the components are provided with a roof or top to protect against the environment.

Figure 6:
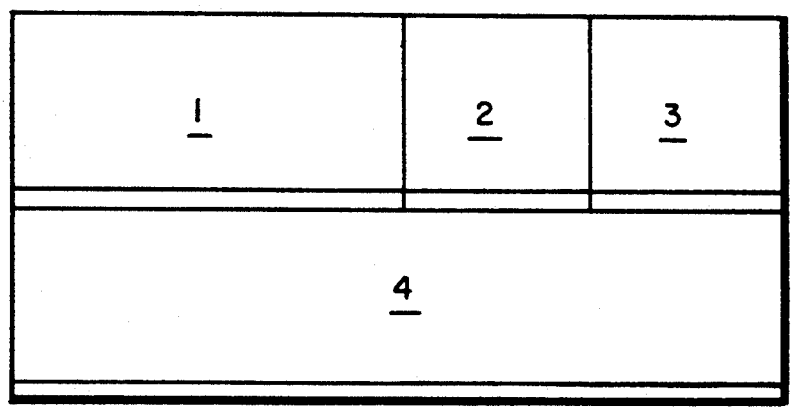
FIG. 6 is a side view of four components of a plastics recycling facility wherein the length, width and height of the components are derived from a grid.

FIG. 6 illustrates a ready-to-operate recycling facility with components 1, 2, 3, 4 that are one, two, and four multiples of a single modules. The capacities of the individual components vary with their dimensions. They are interrelated to optimize exploitation of each component and hence of the total facility, minimizing procurement and operating costs.

The individual components 1, 2, 3, and 4 illustrated in FIG. 6 can as will be evident be placed one on top of as well as next to another. This feature reduces the area occupied by the operating facility to a minimum. All components can be sealed off from the environment and roofed over. It is accordingly simple to operate the facility in the open country.

Figure 7:
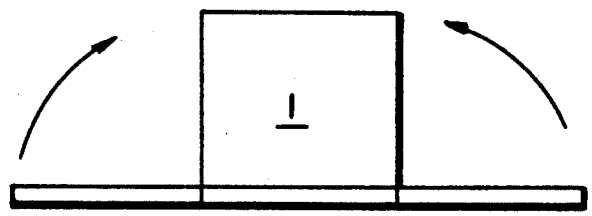
FIG. 7 is a side view of one component of a plastics recycling facility having fold-down doors along both sides.

FIG. 7 is a front view of a component 1 demarcated at opposite sides by foldable walls 27, extending continuously from one end of the component to the other, that facilitate access to the interior. When folded down, the walls 27 constitute portable surfaces that can be exploited for access, working, or storage as necessary. This feature is of particular advantage when the facility is used in marshy or uneven areas.

There has thus been shown and described a novel transportable facility for recycling waste plastics that fulfills all the objects and advantages sought therefor. Many changes, modifications, variations, and other uses and applications of the subject invention will, however, become apparent to those skilled in the art after considering this specification and the accompanying drawing, which discloses the preferred embodiment thereof. All such changes, modifications, variations, and other uses and applications that do not depart from the spirit and scope of the invention are deemed to be covered by the invention, which is to be limited only by the claims that follow.

What is claimed is:

1. A transportable facility for recycling waste thermoplastics comprising at least one chipper, at least one storage hopper, and at least one extruder connected by constant-operation conveyors and integrated into components, wherein the components are individually transportable from site to site and combinable into an enclosed and modular production plant so as to be ready to operate at the site; wherein the edges along the length and width of a vertical projection of each component onto a horizontal surface extend substantially along the lines of a square grid, and wherein the components are of different sizes, there being a largest component and a smallest component, and wherein the vertical projection surface area occupied by the largest component is substantially a whole multiple of the vertical projection surface area occupied by the smallest component.

2. The transportable recycling facility as defined in claim 1, wherein the components are on wheels.

3. The transportable recycling facility as defined in claim 1, wherein the components are on flat-bed trailers.

4. The transportable recycling facility as defined in claim 1, wherein the components are on pallets.

5. The transportable recycling facility as defined in claim 1, wherein the components are equal in at least two of their length, width and height.

6. The transportable recycling facility as defined in claim 1, wherein each component is substantially in the shape of a rectangular parallopiped comprising at least one cube.

7. The transportable recycling facility as defined in claim 1, wherein the external dimensions of the components are such as to enable the components to be positioned next to one another.

8. The transportable recycling facility as defined in claim 1, wherein the external dimensions of the components are such as to enable the components to be stacked.

9. The transportable recycling facility as defined in claim 1, wherein the components have roofs.

10. The transportable recycling facility as defined in claim 1, wherein the components have fold-down doors all the way along at least one side.

* * * * *